United States Patent [19]

Robinson

[11] 4,261,634

[45] Apr. 14, 1981

[54] BOOSTER CABLE ADAPTER

[76] Inventor: Leonard J. Robinson, Rte. 1, Box 975, Carmel, Me. 04419

[21] Appl. No.: 68,588

[22] Filed: Aug. 22, 1979

[51] Int. Cl.[3] .......................... H01R 3/00; H01M 9/00

[52] U.S. Cl. ............................ 339/147 R; 339/154 A

[58] Field of Search ............. 339/29 B, 147 R, 185 R, 339/191 M, 154 A; 320/2, 25

[56] References Cited

U.S. PATENT DOCUMENTS 3,456,181 7/1969 Godshalk ................................ 320/25

3,659,183 4/1972 Carlson .................................. 320/25

3,967,133 6/1976 Bokern ................................. 320/2 X

*Primary Examiner*—Eugene F. Desmond

*Attorney, Agent, or Firm*—David F. Gould

[57] ABSTRACT

Convenience type adapter to be connected to an automobile, boat, or other storage battery by ordinary battery booster cables provided with a receptacle to receive standard type of plug and which is provided with fuses and/or circuit breakers and provision for accepting special purpose connectors to facilitate the use of the battery to operate auxiliary special purpose electrical equipment.

1 Claim, 5 Drawing Figures

BOOSTER CABLE ADAPTER

BACKGROUND OF THE INVENTION

It has heretofore been proposed to provide means for utilizing the storage battery of a vehicle as a source of power for auxiliary equipment, such as spotlights, flood lights, soldering irons, etc., essentially only by providing alligator clips on the power cords of the equipment permitting them to be clipped directly to the positive and negative terminals of the battery. See, for example, U.S. Pat. Nos. 2,491,552 and 1,651,307. It is also known to provide auxiliary electrical equipment for automobiles which may be plugged into the vehicle's cigarette lighter.

The foregoing expedients are not satisfactory for many purposes. It is a nuisance to clip and unclip the equipment directly to the battery and, so far as concerns use of the cigarette lighter, the power available is limited by the capacity of the circuit which provides electricity to the lighter and the connection must be made within the vehicle whereas the auxiliary equipment to be powered will normally be located outside the vehicle.

The object of the invention is to provide an adapter unit which may be clipped to a storage battery, the unit providing suitable receptacles for accepting standard plugs or special plugs of auxiliary equipment and circuit interrupting means to guard against overloads.

SHORT STATEMENT OF THE INVENTION

In accordance with the invention, there is provided an adapter unit which permits ready connection of auxiliary equipment to an ordinary storage battery. The adapter includes a mounting plate of insulating material having a positive input terminal post extending from one side and a negative input terminal post extending from the other side which posts are adapted to be gripped by standard alligator clip connectors of the usual booster battery cable set, the connectors being separated from each other by portions of the plate. A standard low voltage receptacle is mounted at the other end of the plate from the terminal posts for receiving a corresponding plug on the end of the power cord of the auxiliary equipment. Conductors are mounted on the plate providing circuits interconnecting the respective positive and negative terminals of the receptacle to the appropriate terminal posts. Circuit interrupting means is provided in the positive circuit to open the circuit in case of overload.

In preferred embodiments, insulating covers are mounted on each side of the plate, the covers being provided with cutout portions permitting access to the terminal posts and the receptacle; the conductors are mounted on opposite sides of the plate from their respective terminal posts and make contact through the plate to the bases of the posts; auxiliary terminals are provided permitting connection of the unit to auxiliary equipment not provided with a plug fitting the standard low voltage receptacle, the positive auxiliary terminal being protected by the circuit interrupting means or by separate circuit interrupting means; the circuit interrupting means are mounted on the opposite side of the plate from the positive terminal post; and separate circuit interrupting means may be provided for the standard and auxiliary receptacles or both may be guarded by the same means.

DESCRIPTION OF PREFERRED EMBODIMENT

Figure 2:
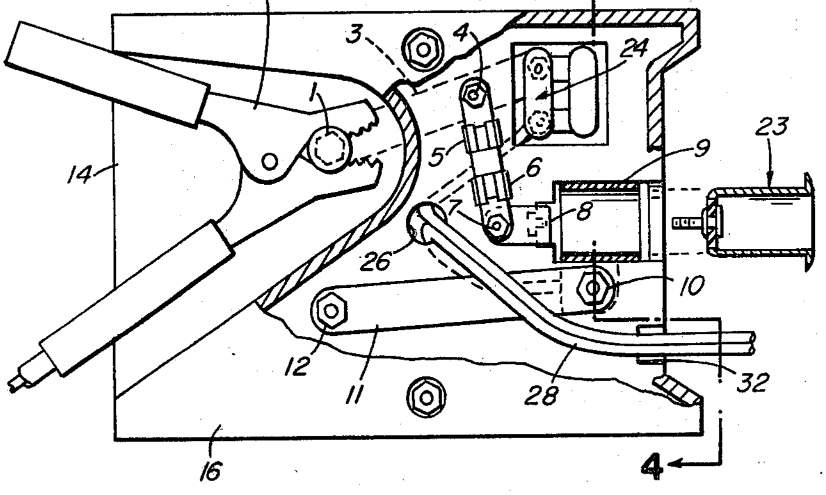
FIG. 2 is an elevation on a much larger scale of one side of the adapter with portions of the cover cut away and partially in section.
Figure 4:
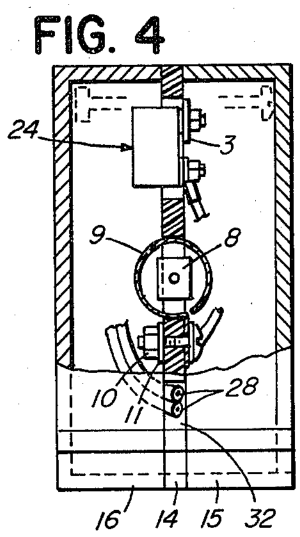
FIG. 4 is a vertical sectional view taken on line 4—4 of FIG. 2.
Figure 3:
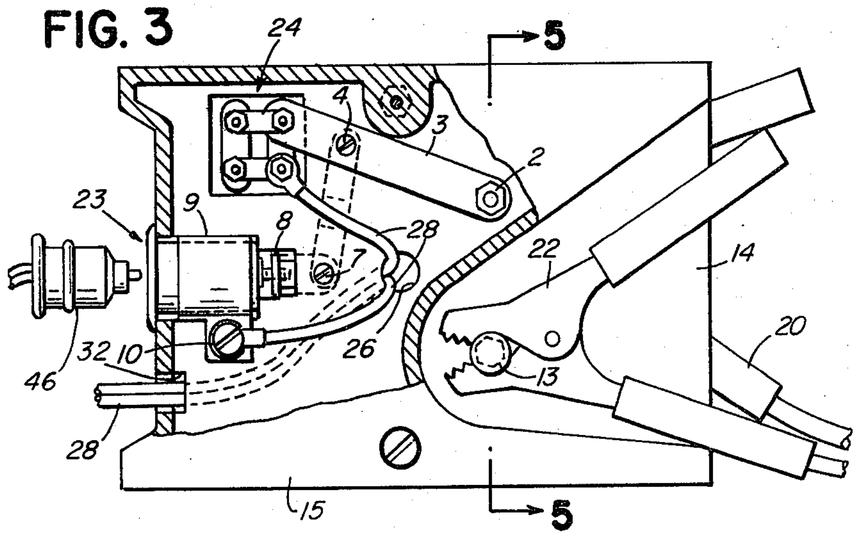
FIG. 3 is a view similar to FIG. 2 of the opposite side of the adapter.
Figure 5:
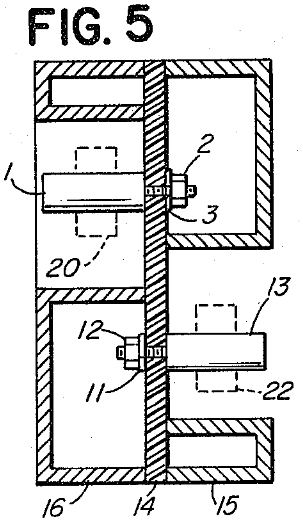
FIG. 5 is a vertical sectional view taken on line 5—5 of FIG. 3.

Referring first to FIGS. 2–5, the adapter unit comprises a flat plate 14 made of an electrically insulating material, wood, or plastic, and two covers 15 and 16 also made of insulating material. All the fuses, circuit breakers, terminals, and circuitry are mounted for convenience on the plate 14. The clamp terminals 1 and 13 are metal rods of a suitable diameter and length for use with the booster cable clamps 20,22. Each terminal 1, 13 is drilled and tapped for machine bolts 2,12, as shown in FIG. 5. The positive terminal 1 is secured to the plate 14 and to a metal strip 3 with machine bolt 2. The metal strip 3 has a hole drilled in the end where a special purpose circuit breaker 24 can be mounted on it in a cutout section of the plate 14 provided for this purpose. There is another hole drilled in the metal strip 3 between its ends where a small machine bolt or rivet 4 fastens it again to the plate 14, and on the other side to one fuse holding terminal 5, (FIG. 2). The fastening device 4 should be an electrical conductor. The fuse holder 5 is aligned with another fuse holding terminal 6, so that a cartridge fuse may be held between them. Holder 6 is connected to the positive or hot terminal 8 of the standard size automobile cigarette lighter 12 volts receptacle 23. The metal terminal 8 and fuse holder 6 are attached to the plate 14 with another small machine bolt or rivet 7.

Parts 1, 2, 3, 4, 5, 6, 7, and 8 comprise the positive circuit portion of the adapter and one side of any electrical device must be connected to one of them. Preferably one connection may be made at one of the holes in part 3 or at the fasteners 4 or 7. A nine ampere fuse may be used to connect the fuse holders 5 and 6, but the user may substitute a larger or smaller size fuse as required for a particular accessory.

The negative or ground circuit portion 9 of the standard size 12 volt outlet 23 is connected to a metal strip 11 and attached to the plate 14 with a small machine bolt 10 (FIG. 2). The metal strip 11 is attached to the plate 14 again at the other end with a machine bolt 12. Bolt 12 also serves to secure the negative booster cable clamp terminal 13 to the plate 14.

When the adapter plate is used for connecting equipment requiring special purpose circuit breakers, cables, and plug, the following procedure is recommended. A short length of positive and negative wire 28 should be connected to the equipment or a special plug 30 for the equipment and the other ends should then be threaded through the hole 26 in line with the accessory socket 9 in the center of the plate 14. The cables should be threaded down into the hole 26 from the positive side of the plate 14; that is, the side with the fuse clips 5 and 6 on it, so that the free ends of the cables 28 extend upwards from the negative side of the plate 14. The negative or ground cable should then be secured to the fastener 10 which also holds the ground part 9 of the accessory socket 23 and the metal strip 11. The positive cable should be connected to one side of the special purpose circuit breaker 24 in such a way that it will not touch the positive metal strip 3, nor bypas the circuit breaker which is secured to the metal strip 3. The use of standard crimp-on type electrical connectors on the cable ends will simplify the intallation and removal of the cables on the circuit breaker 24, and the ground connection 10. The cables 28 having been attached to the adapter plate 14 are positioned in the notch 32 provided for this purpose in the plate 14, and when the covers 15 and 16 are in place, the cables extend from the opening formed by the notch.

The invention can take several forms other than the exact form described herein. The adapter plate 14 could contain a light powered from the 12 volt booster cable circuit or may have an ordinary battery powered flashlight built into it. It could be made with both types of lights built into it. The adapter plate could be made with a permanently built in special purpose plug; such as, an aircraft auxiliary power plug. It might include a special voltage regulator, power amplifier, or some other type of electrical device to alter or "prepare" the electricity received from the booster cables prior to reaching a piece of equipment that requires some form of regulated power supply not provided by the circuit breakers; such as, a portable surface to air missile guidance radar.

Figure 1:
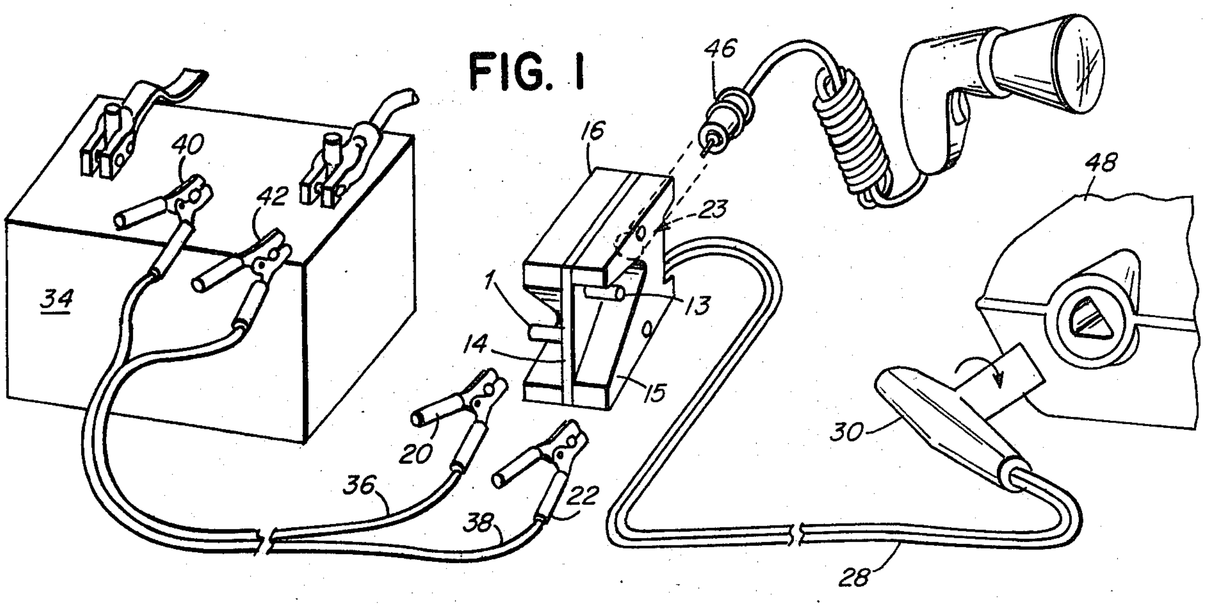
FIG. 1 is a perspective view showing how the novel adapter may be connected to a storage battery by ordinary booster cables while providing a standard low voltage receptacle for use with one type of auxiliary equipment and special connecting means for ready connection to other types of electrical equipment.

In FIG. 1, the utility of the novel adapter becomes evident. From an ordinary storage battery 34, which could be that in a car or boat, ready electrical connection to auxiliary equipment is available through the novel adapter. The booster cables 36, 38 are clamped to the adapter posts 1, 13 by clips 20, 22 and to the battery by clips 40, 42. A spotlight or flood light 44 may be plugged into receptacle 23 by means of standard plug 46. Special equipment 48 may be powered through cable 28 and receptacle 30.

I claim:

1. An adaptor unit to permit ready connection to a storage battery of auxiliary equipment comprising:

a mounting plate of insulating material, said plate having a positive input terminal post extending from one surface and a negative input terminal post extending from the opposite surface adapted to be gripped by the clamps of the usual battery booster cable set, the clamps being separated from each other by portions of the plate, a receptacle having respective positive and negative terminals mounted on the plate for receiving a corresponding plug on the power cord of the auxiliary equipment, conductors mounted on said plate providing positive and negative circuits interconnecting the respective terminals of the receptacle and said posts, means for connecting wires to the conductors mounted on said plate, and insulating covers for the opposite surfaces of said plate, provided with cut out portions permitting access to said posts and said receptacle.

* * * * *